United States Patent [19]
Caron

[11] Patent Number: 5,483,829
[45] Date of Patent: Jan. 16, 1996

[54] ENVIRONMENTAL FLOW STAND INLET FLOW CONDITIONER

[75] Inventor: Richard W. Caron, Canton, Mich.

[73] Assignee: Ford Motor Company, Dearborn, Mich.

[21] Appl. No.: 262,283

[22] Filed: Jun. 20, 1994

[51] Int. Cl.⁶ ............................. G01F 15/00; G01F 25/00
[52] U.S. Cl. ....................................... 73/198; 73/3
[58] Field of Search ................ 73/272 R, 865.6, 73/3, 198

[56] References Cited

U.S. PATENT DOCUMENTS

| | | | |
|---|---|---|---|
| H056 | 5/1986 | Chandler et al. | 73/195 |
| 4,280,360 | 7/1981 | Kobayoshi et al. | 73/198 |
| 5,131,591 | 7/1992 | Gill | 73/3 X |
| 5,253,517 | 10/1993 | Molin et al. | 73/118.2 |

FOREIGN PATENT DOCUMENTS 18795  1/1993  Japan .

*Primary Examiner*—Thomas P. Noland
*Attorney, Agent, or Firm*—Peter Abolins; R. L. May

[57] ABSTRACT

This invention includes straightening and curving air flow within an environmental test chamber so as to improve the testing of a mass air flow meter by maintaining a uniform air flow velocity profile and constrain the size of the environmental test chamber. Such size constraint facilitates the task of maintaining a desired environment within the chamber.

4 Claims, 1 Drawing Sheet

ENVIRONMENTAL FLOW STAND INLET FLOW CONDITIONER

BACKGROUND OF THE INVENTION

1. Field of the Invention

This invention relates to the field of mass air flow sensors and in particular to a production line test apparatus for conditioning air flow.

2. Prior Art

As part of the normal development process and ongoing quality control, mass air flow sensors must be environmentally flow tested. To environmentally flow test a mass air flow sensor, it is placed in an environmental chamber which controls humidity, temperature and pressure, and then conditioned air is flowed through it. In order to maintain a uniform temperature distribution inside the environmental chamber, fans move and mix the air inside. This mixing action leads to a non-uniform air flow profile at the inlet to the mass air flow sensor, seriously degrading its test performance.

It is known to attempt to straighten air flow by using a bell mouth intake inlet to the mass air flow meter. While this may straighten air flow to some extent, it does not provide for a uniform velocity profile for the air entering the mass air flow meter. Such a uniform velocity profile is particularly advantageous to improve accuracy of measurement and testing. It is known to provide an air filter with pleats for such a bell mouth. However, such pleats may also not provide an advantageously uniform velocity profile. Further, a bell mouth does not provide for a reduced length for the environmental test chamber. An environmental flow stand inlet flow conditioner in accordance with an embodiment of this invention eliminates these drawbacks.

SUMMARY OF THE INVENTION

This invention provides a relatively compact air flow conditioner for use in connection with an environmental test chamber. Compactness is advantageous because a smaller volume of air must be maintained at the desired environmental conditions with respect to temperature, pressure, and humidity. A large environmental test stand is difficult to maintain and requires more energy for operation.

A compact and uniform air flow in accordance with an embodiment of this invention is achieved through air flow conditioning including a screening arrangement for straightening air flow and a back curve air flow guide for reversing the direction of the air flow. Such reversal of direction permits a longer air flow path to be contained within a box of smaller dimensions. Advantageously, the screening arrangement includes a honeycomb for passing air and a plurality of screens with different size openings. The result of such an arrangement is an improved velocity profile at the mass air flow sensor which permits better testing of the mass air flow sensor.

BRIEF DESCRIPTION OF THE DRAWINGS

The Figure is a section view of an inlet air flow conditioner in accordance with an embodiment of this invention.

DETAILED DESCRIPTION OF THE INVENTION

Figure 1:
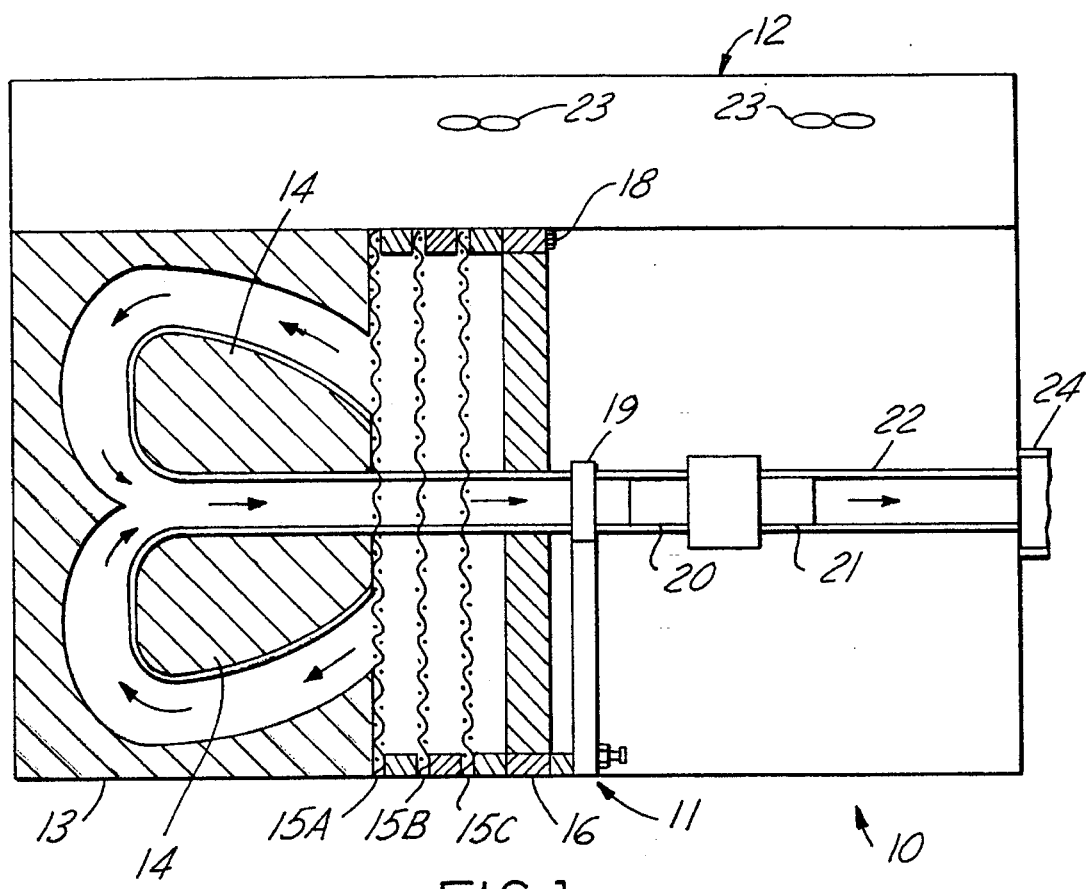

Referring to the Figure, an air flow conditioner 10 is assembled in the following manner. A mounting frame 11 is placed into an environmental chamber 12, then an outer shell 13 is positioned on mounting frame 11. An inlet cone 14 is positioned inside outer shell 13, but not clamped to mounting frame 11. A three screen conditioner 15 is then slid over inlet cone 14. This three screen conditioner 15 contains three screens 15A, 15B, 15C of different mesh sizes, with equal spacing (air gaps) between screens 15A, 15B, and 15C. The mesh sizes from right to left are 24 for screen 15C, 32 for screen 15B and 40 for screen 15A. A honeycomb conditioner 16 with a spacer section 17 is slid over inlet cone 14. Fasteners 18 are used to hold three screen conditioner 15 and honeycomb conditioner 16 to outer shell 13. Inlet cone 14 is clamped to mounting frame 11 using a cone clamp 19. Inlet cone 14 has an inside diameter much larger than that of any mass air flow sensor to be flow tested. Therefore, an inlet adapter 20 is needed as an interface between the mass air flow sensor being tested and flow conditioner 10. The mass air flow sensor is connected to inlet adapter 20. An outlet adapter 21 is connected to act as an interface between the mass air flow sensor and an outlet flow tube 22.

The shape and combination of inlet cone 14 and outer shell 13 are such that straightened air leaving three screen conditioner 15 continues to have straightened, non-turbulent flow. In part, this is achieved by the curvatures of inlet cone 14 and outer shell 13. The shape of outer shell 13 and inlet cone 14 is typically formed by trial and error so that uniform air flow velocity is achieved at the mass air flow sensor to be tested. Advantageously, the shapes for shell 13 and cone 14 are modeled on a software package which simulates the effects on the air flow velocity profile as the geometry of shell 13 and 14 are changed. Additionally, a scale model can then be built, tested, and adjusted to fine tune the shapes for best performance.

In operation, an environmental condition of a desired temperature, pressure and humidity is set in environmental chamber 12. To achieve an uniform environment inside chamber 12, fans 23 are used to mix the air. This mixing action occurs with air velocities much greater than the majority of the air flow rates at which the mass air flow sensor is flow tested. Without an inlet flow conditioner this mixing action would adversely affect the test results of the mass air flow sensor being tested. Once the environmental condition has stabilized at the desired condition, an air flow rate is set using the flow measurement system. Once the air flow is started, the inlet flow conditioner causes air to be pulled through honeycomb conditioner 16. Thus honeycomb conditioner 16 acts as a flow straightener, removing the turbulence of the mixed air.

This straightened air flow has a non-uniform air velocity profile. The air is then pulled through three screen conditioner 15. Three screen conditioner 15 dissipates the flow energy in such a matter that the air exiting the last screen (15A) has a uniform air velocity profile across the complete cross section. The air then flows around inlet cone 14 and into the mass air flow sensor. The shape of inlet cone 14 and outer shell 13 are designed to maintain this uniform air velocity profile all the way to the mass air flow sensor. The air then flows through the mass air flow sensor and into a flow measurement system 24 downstream of the mass air flow sensor.

Various modifications and variations will no doubt occur to those skilled in the arts to which this invention pertains. Such variations which basically rely on the teachings through which this disclosure has advanced the art are properly considered within the scope of this invention.

What is claimed:

1. An air flow conditioner for regulating air flow into a mass air flow meter including:

a screen means for passing air and for straightening air flow; and an air guide for changing the direction of air flow, said air guide being positioned downstream of said screen means and upstream of the mass air flow meter wherein said screen means includes;

a honeycomb means having a plurality of openings extruding axially in the direction of air flow straightening air flow and a generally planar sheet having a plurality of openings for passing air flow and for straightening air flow, wherein said generally planar sheet includes a plurality of layers, with the layers having generally smaller openings in the downstream direction of air flow.

2. An air flow conditioner as recited in claim 1 wherein said mass air flow meter is located in an air flow path of an environmental test chamber and said air guide includes a curved portion downstream of said screen means for increasing the length of the air flow path without increasing the longitudinal length of the environmental test chamber, so that the length of the air flow path is longer than the length of the air flow conditioner in any one dimension.

3. An air flow conditioner as recited in claim 2 wherein said air guide changes the direction of air flow about 180 degrees.

4. An air flow conditioner as recited in claim 3 wherein said air guide includes an inlet cone having a curvature which maintains a uniform velocity profile for the air flow as air flow passes around the air guide.

* * * * *